(12) United States Patent
Jain et al.

(10) Patent No.: US 12,335,124 B2
(45) Date of Patent: Jun. 17, 2025

(54) SUBSCRIPTION-BASED SUSTAINABLE NETWORK ADMINISTRATION

(71) Applicant: Cisco Technology, Inc., San Jose, CA (US)

(72) Inventors: Prakash C. Jain, Fremont, CA (US); Sanjay K. Hooda, Pleasanton, CA (US); Kabiraj Sethi, Fremont, CA (US); Vinay Saini, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 56 days.

(21) Appl. No.: 18/349,799

(22) Filed: Jul. 10, 2023

(65) Prior Publication Data

US 2025/0023807 A1 Jan. 16, 2025

(51) Int. Cl.
*H04L 43/0876* (2022.01)

(52) U.S. Cl.
CPC .............................. *H04L 43/0876* (2013.01)

(58) Field of Classification Search
CPC .. H04L 43/0876; H04L 43/08; H04L 41/0833
See application file for complete search history.

(56) References Cited

U.S. PATENT DOCUMENTS

| | | | |
|---|---|---|---|
| 2011/0255404 A1* | 10/2011 | Kafka | H04L 43/16 370/232 |
| 2012/0281711 A1 | 11/2012 | Karaoguz et al. | |
| 2012/0329449 A1 | 12/2012 | Das et al. | |
| 2013/0043730 A1 | 2/2013 | Claise et al. | |

(Continued)

FOREIGN PATENT DOCUMENTS

KR 20210052925 A 5/2021

OTHER PUBLICATIONS

Biswas, J., et al. "Coordinated Power Management in Data Center Networks," ScienceDirect, Sustainable Computing: Informatics and Systems Jun. 22, 2019.

(Continued)

*Primary Examiner* — Anh Nguyen
(74) *Attorney, Agent, or Firm* — Rutan & Tucker, LLP; Ravi Mohan

(57) ABSTRACT

Described herein are systems and methods for optimizing energy efficiency in a network utilizing a control plane or other network administration device or software suite. The control plane continuously monitors end-to-end network paths and collects real-time data about network topology, traffic patterns, and connected devices. By analyzing the collected network data, the control plane identifies power needs for network nodes and generates energy saving recommendations or instructions tailored to each node's specific capabilities. Network nodes can subscribe to the energy efficiency service provided by the control plane, receive network usage data, and execute energy saving operations based on the recommendations. The control plane dynamically updates the energy saving recommendations in response to changes in network conditions, enabling network nodes to optimize their energy efficiency without compromising network performance and availability. These updates can be based on current network conditions but can be generated from historical data and/or machine learning processes.

20 Claims, 10 Drawing Sheets

(56) References Cited

U.S. PATENT DOCUMENTS

| | | | |
|---|---|---|---|
| 2014/0370843 A1* | 12/2014 | Cama | H04W 24/08 |
| | | | 455/405 |
| 2018/0049096 A1 | 2/2018 | Logvinov et al. | |
| 2019/0272011 A1* | 9/2019 | Goergen | G06F 1/266 |
| 2020/0137631 A1* | 4/2020 | Yang | H04W 76/45 |
| 2020/0162337 A1 | 5/2020 | Jain et al. | |
| 2021/0112034 A1* | 4/2021 | Sundararajan | H04L 41/0893 |
| 2022/0408286 A1* | 12/2022 | Kumar | H04W 52/10 |
| 2023/0095746 A1 | 3/2023 | Estabrooks et al. | |

OTHER PUBLICATIONS

Aboul-Magd O., et al., "Joint SEE-Mesh/Wi-Mesh Proposal to 802.11 TGs", IEEE 802.11-06/0328r0, Feb. 27, 2006, Retrieved from http://www.ieee802.org/11/DocFiles/06/11-06-0328-00-000s-joint-seemesh-wimesh-proposal-to-802-11-tgs.doc, pp. 1-108, XP002497826, The Whole Document.

International Search Report and Written Opinion for International Application No. PCT/US2024/035892, mailed Oct. 4, 2024, 17 Pages.

* cited by examiner

SUBSCRIPTION-BASED SUSTAINABLE NETWORK ADMINISTRATION

The present disclosure relates to energy efficiency in computer networks. More particularly, the present disclosure relates to dynamically reducing end-to-end power usage in networking devices utilizing a control plane.

BACKGROUND

The increasing demand for network connectivity in various sectors, including businesses, homes, and public spaces, has led to the widespread deployment of network devices such as switches, routers, access points, and servers. These devices may provide seamless communication and access to various services, including internet connectivity, data storage, and application hosting. As the number of network devices and the scale of networks continue to grow, power consumption has become a concern for network operators and administrators.

In traditional computer networks, power consumption is often not optimized, as network devices may be designed to provide continuous operation and high availability. Consequently, these devices may consume a considerable amount of power, even during periods of low network traffic or device utilization. This inefficient power usage not only leads to increased energy costs but also contributes to the overall carbon footprint of the network infrastructure.

Various approaches have been proposed to address the issue of power consumption in networks. However, these solutions often focus on individual devices. Such approaches are limited in their ability to adapt to changing network conditions and ensure optimal energy efficiency.

SUMMARY OF THE DISCLOSURE

Systems and methods for dynamically reducing end-to-end power usage in networking devices utilizing a control plane in accordance with embodiments of the disclosure are described herein. In some embodiments, a device, includes a processor, at least one network interface controller configured to provide access to a network, and a memory communicatively coupled to the processor. The memory includes an energy efficiency logic that is configured to register at least one network node of the network as a subscriber of network energy efficiency service, determine a network usage data associated with the at least one network node, the network usage data being associated with one or more energy saving operations in at least one end-to-end path including the at least one network node; and transmit the network usage data to the at least one network node.

In some embodiments, a device, wherein the network usage data is associated with at least one of a number of end devices associated with the at least one network node, a data rate, application data, network traffic data, one or more network traffic counters, one or more NetFlow records, or a power usage estimate.

In some embodiments, a device, the energy efficiency logic being further configured to: detect an update to the network usage data associated with the at least one network node; and transmit the updated network usage data to the at least one network node.

In some embodiments, a device, the energy efficiency logic being further configured to: identify an energy saving opportunity for the at least one network node, wherein the network usage data includes an instruction or a recommendation to execute at least one energy saving operation at the at least one network node.

In some embodiments, a device, wherein the at least one energy saving operation includes changing an energy saving level, the energy saving level being associated with power delivered to the at least one network node by a power sourcing equipment (PSE) network device.

In some embodiments, a device, wherein the device is associated with a control plane of the network.

In some embodiments, a device, wherein the control plane of the network utilizes at least one control protocol including at least one of a border gateway protocol-Ethernet virtual private network (BGP-EVPN), a locator/identifier (ID) separation protocol (LISP), or an overlay management protocol (OMP).

In some embodiments, a device, wherein the control plane of the network resides on-premises or in a cloud.

In some embodiments, a network node, includes a processor, at least one network interface controller configured to provide access to a network, and a memory communicatively coupled to the processor. The memory includes energy efficiency logic that is configured to subscribe to a network energy efficiency service provided at least in part by a control plane of the network, receive a network usage data from a device associated with the control plane of the network, the network usage data being associated with one or more energy saving operations in at least one end-to-end path including the network node; and execute at least one energy saving operation based on the network usage data.

In some embodiments, a network node, wherein the network node includes at least one of a router, a switch, a server, an access point, a wireless controller, a voice over internet protocol (VoIP) telephone, an internet of things (IoT) device, or a power over Ethernet (PoE) powered device.

In some embodiments, a network node, wherein the network usage data is associated with at least one of a number of end devices associated with the network node, a data rate, application data, network traffic data, one or more network traffic counters, one or more NetFlow records, or a power usage estimate.

In some embodiments, a network node, wherein the at least one energy saving operation includes adjusting a power consumption setting of at least one component of the network node.

In some embodiments, a network node, wherein adjusting the power consumption setting of the at least one component of the network node includes at least one of: powering down the network node, powering up the network node, deactivating a power supply module, activating the power supply module, entering a low power mode, exiting the low power mode, changing an energy saving level, switching off a transmitter, switching on the transmitter, switching off a receiver, or switching on the receiver.

In some embodiments, a network node, the energy efficiency logic being further configured to: determine a power need for the network node based on analyzing the network usage data; and determine the at least one energy saving operation based on the determined power need for the network node.

In some embodiments, a network node, wherein the network usage data includes an instruction or a recommendation to execute the at least one energy saving operation at the network node.

In some embodiments, a network node, wherein the at least one energy saving operation includes changing an energy saving level, the energy saving level being associated with power delivered to the network node by a power sourcing equipment (PSE) network device.

In some embodiments, a network node, the energy efficiency logic being further configured to: negotiate a power delivery configuration with the PSE network device based on a discovery protocol.

In some embodiments, a network node, the energy efficiency logic being further configured to: receive updated network usage data from the device associated with the control plane of the network; and execute at least one second energy saving operation based on the updated network usage data.

In some embodiments, a network node, wherein the subscription to the network energy efficiency service is associated with a granularity level corresponding to a scope.

In some embodiments, a method for reducing network energy consumption, includes registering at least one network node of a network as a subscriber of network energy efficiency service, determining network usage data associated with the at least one network node, the network usage data being associated with one or more energy saving operations in at least one end-to-end path including the at least one network node; and transmitting the network usage data to the at least one network node.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
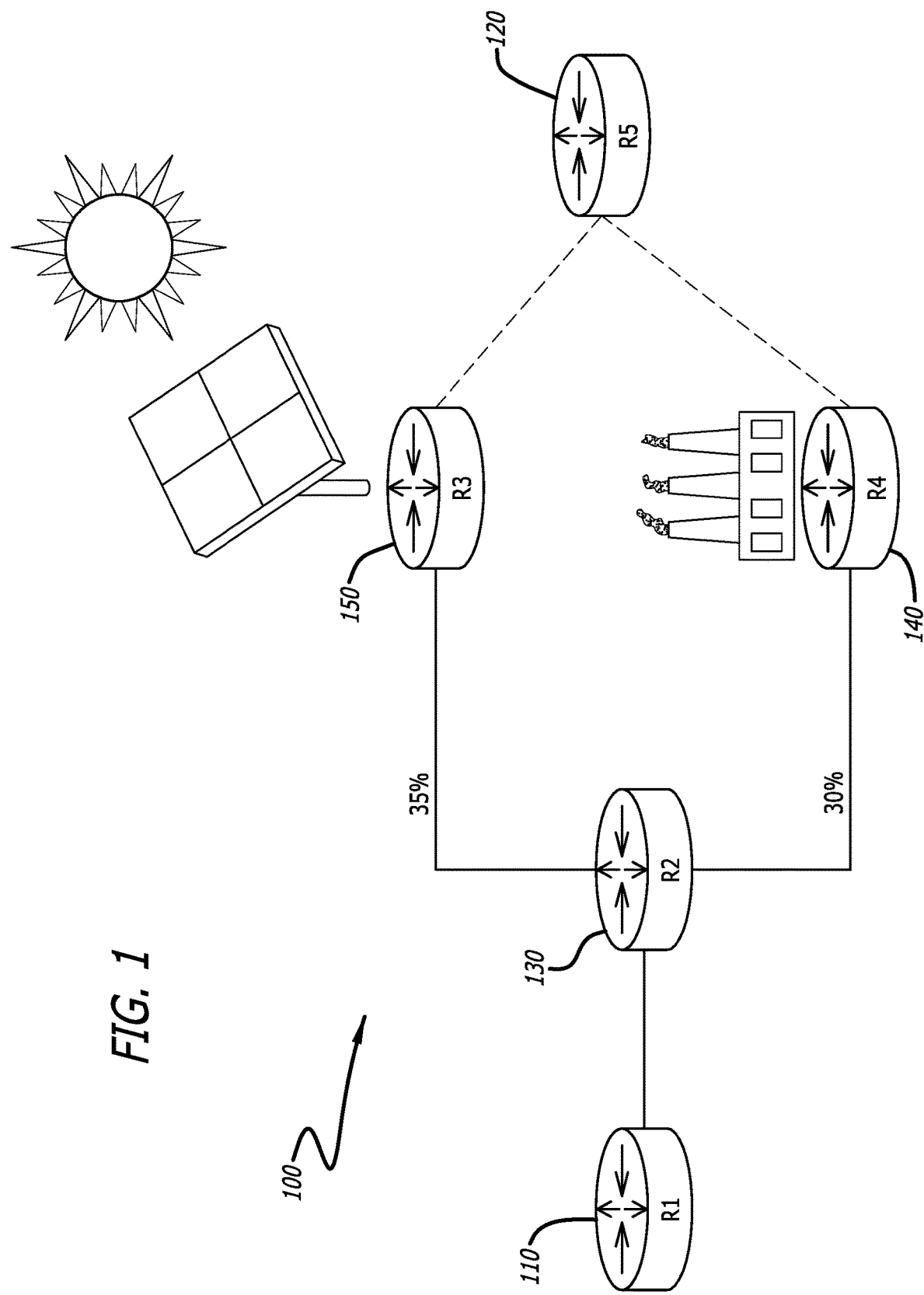
FIG. 1 is a schematic diagram of a network with network devices powered by various power source types in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that manage power consumption across network paths to optimize energy efficiency without compromising network performance and availability. An external control plane may provide network usage data (e.g., metadata) to networking devices (e.g., routers, switches, border devices, edge devices, access points, servers, wireless controllers, voice over internet protocol (VoIP) telephones, internet of things (IoT) devices, and power over Ethernet (PoE)-powered devices, etc.) to help to dynamically reduce end-to-end power usage for the networking devices.

In many embodiments, a centralized control plane (e.g., a green service control plane) may be used. The control plane may have knowledge of the entire network paths, including multiple networking devices (which may be referred to hereinafter, interchangeably, as network nodes) and their power saving capabilities. The control plane may monitor and analyze real-time network conditions, such as, but not limited to, the number of connected devices (e.g., end devices), traffic patterns, and service utilization. The control plane may provide the network usage data to the networking devices on the network paths to help the networking devices make power saving decisions. In a number of embodiments, based on the data about the real-time network conditions, the control plane may dynamically adjust the power saving features of individual networking devices on the network paths (e.g., by providing recommendations or instructions) to optimize energy efficiency while maintaining network performance.

In a variety of embodiments, the control plane, which may be on-premises and/or cloud-based, may utilize protocols such as, but not limited to, the locator/identifier (ID) separation protocol (LISP), border gateway protocol-Ethernet virtual private network (BGP-EVPN), or the overlay management protocol (OMP) for the software-defined wide area network (SD-WAN). In some embodiments, the control plane may transmit data to the network nodes using a push-based protocol. In more embodiments, the control plane may transmit data to the network nodes using a pull-based protocol. In additional embodiments, the control plane may transmit data to the network nodes in accordance with a publish/subscribe (pub-sub) framework. In further embodiments, the control plane may be a virtual control plane that may include an on-premises local site service control plane and a transit site service control plane in the cloud. In still more embodiments, the control plane may be used in traditional networks and/or overlay networks.

In still further embodiments, network nodes may subscribe to a network energy efficiency service provided by the control plane. These network nodes may receive network usage data, including metadata associated with energy saving operations in end-to-end paths, from the control plane. In still additional embodiments, the network usage data may enable the network nodes to determine their power needs and make informed decisions about when and how to save power, potentially resulting in greater energy savings than when the end-to-end network usage data is not available to the individual network nodes. In some more embodiments, the network usage data (e.g., metadata) may include one or more of the number of end users associated with the network nodes, data rates, application data, network traffic data, network traffic counters, NetFlow records, and/or power usage estimates.

In certain embodiments, network nodes may subscribe to the network energy efficiency service with varying granularity levels. By way of non-limiting examples, a network node may subscribe to change updates within a virtual network, within a subnet, or at a specific server (i.e., change updates corresponding to a scope). Based on the subscription granularity levels, the control plane may automatically publish change updates to subscribing network nodes in the network, allowing the subscribing network nodes to adjust their power saving functionality accordingly.

In yet more embodiments, the network nodes, which may be power sourcing equipment (PSE) network devices and/or powered devices (PDs) may utilize a power negotiation protocol (e.g., a discovery protocol, such as, but not limited to, the Cisco discovery protocol (CDP) or the link layer discovery protocol (LLDP), etc.) to manage and control the delivered power (e.g., power delivered over PoE) between the network nodes.

Accordingly, the devices and methods disclosed herein may provide a solution to manage power consumption across end-to-end network paths by leveraging a centralized control plane. Managing power while taking into consideration conditions on entire end-to-end paths may help to maintain network performance and availability. The control plane may monitor and analyzes real-time network conditions and may then provide network usage data to individual network nodes on the network paths to help the individual network nodes to dynamically adjust the power saving features, improving energy efficiency without compromising network performance, availability, functionality, and effectiveness.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the CO2e kg/kWh metric which measures the amount of kilowatt hours produced per kilogram of carbon dioxide gases released into the environment. Therefore, when discussing a negative environmental impacts-heavy power source compared to a clean(er) power source, the clean power source can, for example, have a better CO2e kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-10 as required to realize a particularly desired embodiment. Augmented protocols to carry out these described processes are described below.

Figure 2:
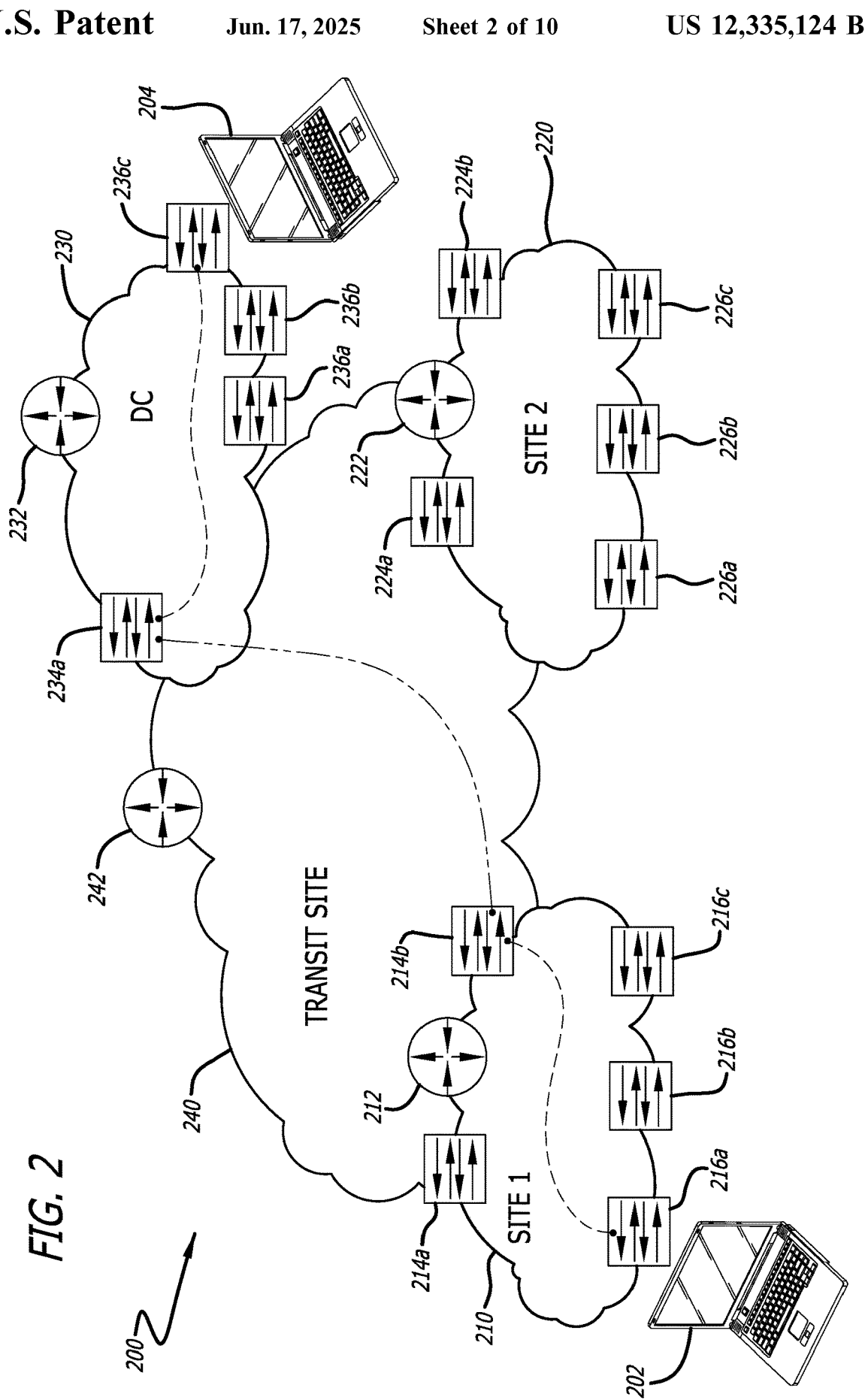
FIG. 2 is a diagram illustrating a network architecture of a multi-site environment in accordance with various embodiments of the disclosure.

Referring to FIG. 2, a diagram illustrating a network architecture of a multi-site environment 200 in accordance with various embodiments of the disclosure is shown. The network architecture may include a first site 210, a second site 220, a data center 230, and a transit site 240. The first site 210 may include a control plane 212 and two border routers 214*a* and 214*b*, which may be situated along the border with the transit site 240. Similarly, the second site 220 may have a control plane 222 and two border routers 224*a* and 224*b* on its border with the transit site 240. The data center 230 may include a control plane 232 and two border routers 234*a* and 234*b*, located on the border with the transit site 240. Notably, no border may exist between the first site 210, the second site 220, and the data center 230.

The transit site 240 may contain a transit control plane 242, and by way of non-limiting examples, may function as an internet protocol (IP)-transit site, an SD-WAN transit site, or overlay transit site. Within the first site 210, there may be three edge switches 216*a*, 216*b*, and 216*c*, while the second site 220 may also have three edge switches 226*a*, 226*b*, and 226c. Similarly, the data center 230 can also comprise three edge switches 236a, 236b, and 236c. A host 202 may connect to the edge switch 216a at the first site 210, and a server 204 may connect to the edge switch 236c in the data center 230. Furthermore, the edge switches 216a, 216b, 216c, 226a, 226b, 226c, 236a, 236b, and 236c may be part of a fabric network.

An end-to-end path 206 is illustrated in the embodiment depicted in FIG. 2 between the host 202 and the server 204, which may pass through the edge switch 216a, the border router 214b, the transit site 240, the border router 234a, and the edge switch 236c. The control planes 212, 222, and 232 at the first site 210, the second site 220, and the data center 230, respectively, may communicate with the transit control plane 242 at the transit site 240. These control planes can exchange data about network topology, energy efficiency, and other pertinent metadata.

In certain embodiments, the control planes may exchange data based on the LISP framework. In these embodiments, the LISP framework may be utilized in the multi-site environment 200. In particular, the control planes may act as map servers/resolvers, maintaining the mapping between endpoint identifiers (EIDs) and routing locators (RLOCs). Often, IP addresses may be used as or may be used to derive EIDs. When a source device, such as a router or switch, wants to send a packet to a destination device, it may query the control plane to obtain the RLOC corresponding to the destination EID. In such embodiments, the control plane, using its mapping database, may respond with the appropriate RLOC. The source device may, in some embodiments, then encapsulate the packet with an outer header containing the source RLOC and the destination RLOC and an inner header containing the EIDs, ensuring that the packet is correctly routed to the destination device and that the networking devices may still communicate at the application level.

In a number of embodiments, the control planes may provide network usage data in addition to the destination data (e.g., destination RLOC) to the network nodes, enabling them to make informed decisions about when and how to save power. By way of a non-limiting example, the data about the end-to-end path 206 between the host 202 and the server 204 may be part of the network usage data provided by the control planes for power saving. In particular, the data about the end-to-end path 206 may help the network nodes that the end-to-end path 206 passes through save power.

Although a specific embodiment for a network architecture suitable for carrying out the various steps, processes, methods, and operations described herein is discussed with respect to FIG. 2, any of a variety of systems and/or processes may be utilized in accordance with embodiments of the disclosure. For example, the control plane may be a unique network device, or it may be incorporated within a different network device. The control plane may also be hardware based or part of a network administration software suite that is operated on the network or remotely via a cloud-based service or the like. The elements depicted in FIG. 2 may also be interchangeable with other elements of FIGS. 1 and 3-10 as required to realize a particularly desired embodiment.

Figure 3:
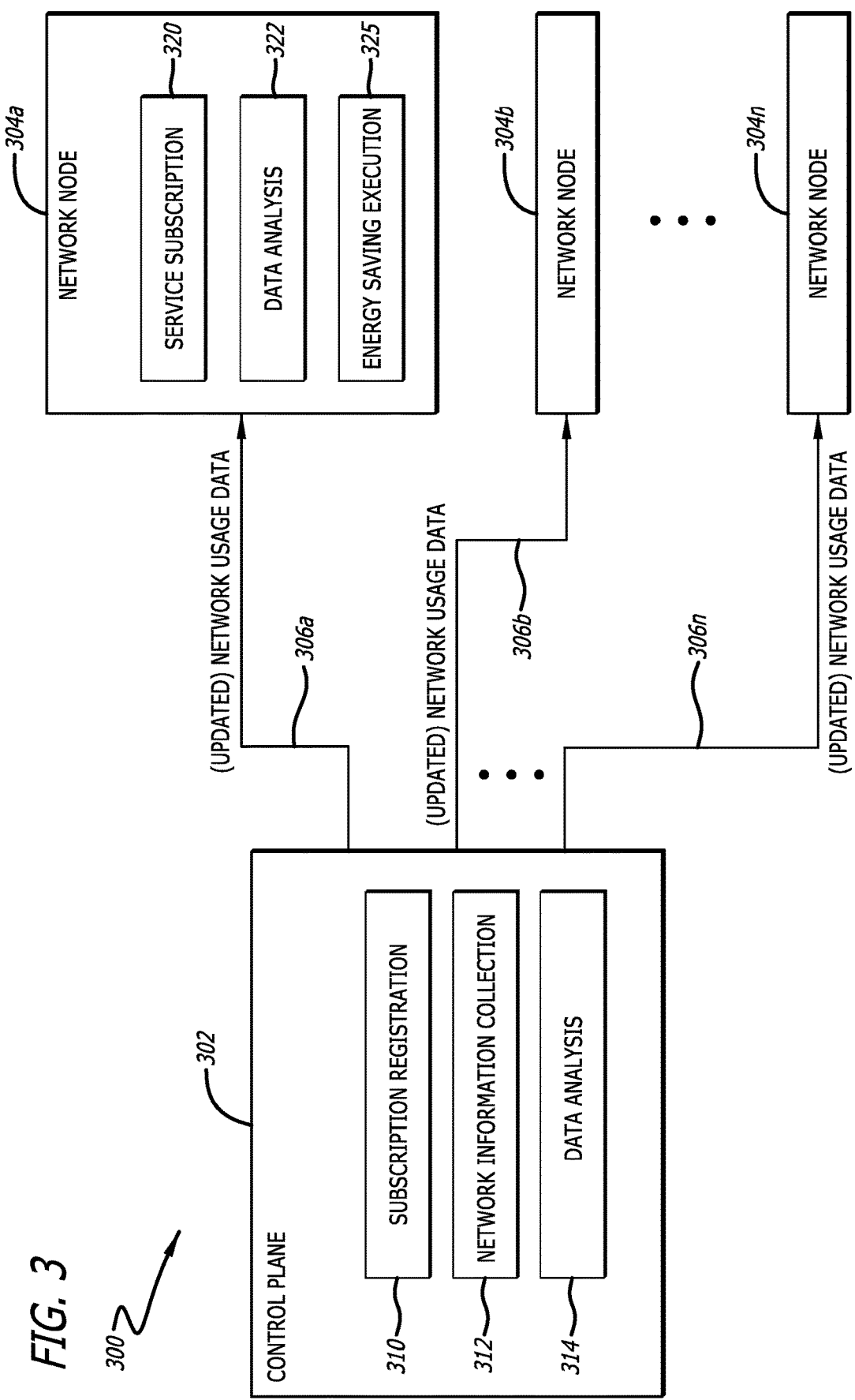
FIG. 3 is a block diagram of a control plane and multiple network nodes in accordance with various embodiments of the disclosure.

Referring to FIG. 3, a block diagram 300 of a control plane and multiple network nodes in accordance with various embodiments of the disclosure is shown. The embodiment depicted in FIG. 3 illustrates a control plane 302, which may further include a subscription registration module 310, a network data collection module 312, and a data analysis module 314. FIG. 3 also shows various network nodes including network nodes 304a, 304b, and 304n.

In various embodiments, the control plane 302 may be responsible for providing the network energy efficiency service to the network nodes. In particular, the subscription registration module 310 may allow network nodes to subscribe to the network energy efficiency service. The subscription registration module 310 can also be configured in certain embodiments to enable the control plane 302 to keep track of the participating network nodes. In many embodiments, the subscription registration module 310 may also enable the control plane 302 to keep track of the respective power saving capabilities of the subscribing network nodes.

In further embodiments, the network data collection module 312 may gather real-time network condition data, such as, but not limited to, the number of end devices connected to the network nodes, a data rate, application data, network traffic data, network traffic counters, NetFlow records, or power usage estimates. In a number of embodiments, the control plane 302 may provide the network condition data as the network usage data 306a, 306b, and 306n to the network nodes to help the network nodes make decisions about energy saving operations. In a variety of embodiments, the control plane 302 may analyze the network condition data and generate energy saving recommendations or instructions to the network nodes. The control plane 302 may also transmit the energy saving recommendations or instructions to the network nodes as part of or along with the network usage data 306a, 306b, and 306n.

In various embodiments, the data analysis module 314 can process the collected network condition data and generate energy saving recommendations or instructions for the individual network nodes. The recommendations or instructions may be based on the analysis of network conditions and the power saving capabilities of the network nodes. In some embodiments, the network nodes 304a, 304b, and 304n may represent various networking devices in the network, such as, but not limited to, routers, switches, border nodes, edge nodes, servers, access points, wireless controllers, VoIP telephones, IoT devices, or PoE powered devices. In particular, as shown, the network node 304a may include a service subscription module 320, a data analysis module 322, and an energy saving execution module 324.

In additional embodiments, the service subscription module 320 may enable the network node 304a to request and subscribe to the network energy efficiency service provided by the control plane 302. Once subscribed, the network node 304a may be configured to receive the network usage data 306a from the control plane 302. In more embodiments, the network node 304a may receive updated network usage data 306a from the control plane 302 as the updates become available, so that the network node 304a may be kept abreast of the latest data about the network conditions.

The data analysis module 322 may process the received network usage data 306a to determine the appropriate power saving adjustments for the network node 304a. In additional embodiments, these adjustments may be based on the real-time network conditions and the power saving capabilities of the network node 304a. By way of a non-limiting example, if no data transmission is expected in the near future on the end-to-end paths that pass through the network node 304a, the data analysis module 322 can determine to switch off (or place in a low power mode) both the transmitter and the receiver of the network node 304a. It should be recognized by those skilled in the art that if the network usage data 306a is not available to the network node 304a, in certain situations, the network node 304a may be able to switch off (or place in a low power mode) its transmitter but not its receiver because the network node 304a may not know whether any data is forthcoming.

In further embodiments, the power saving adjustments/operations determined by the data analysis module 322 may include adjusting a power consumption setting of at least one component of the network node 304a. By way of non-limiting examples, the power saving adjustments/operations may include one or more of powering down/up of the network node 304a, deactivating/activating a power supply module, entering a low power mode, exiting a low power mode (i.e., waking up), changing a power saving level, switching off/on a transmitter, switching off/on a receiver, changing a fan speed (e.g., as measured in revolutions per minute (RPM)), and/or changing a power level received from/delivered to a PoE port. The energy saving execution module 324 may then implement the power saving adjustments determined by the data analysis module 322.

Although a specific embodiment for a control plane interacting with multiple network nodes in the context of an energy efficient network architecture suitable for carrying out the various steps, processes, methods, and operations described herein is discussed with respect to FIG. 3, any of a variety of systems and/or processes may be utilized in accordance with embodiments of the disclosure. For example, the control plane may incorporate one or more machine learning processes to predict network usage patterns and proactively adjust energy saving settings for the network nodes. The elements depicted in FIG. 3 may also be interchangeable with other elements of FIGS. 1, 2, and 4-10 as required to realize a particularly desired embodiment.

Figure 4:
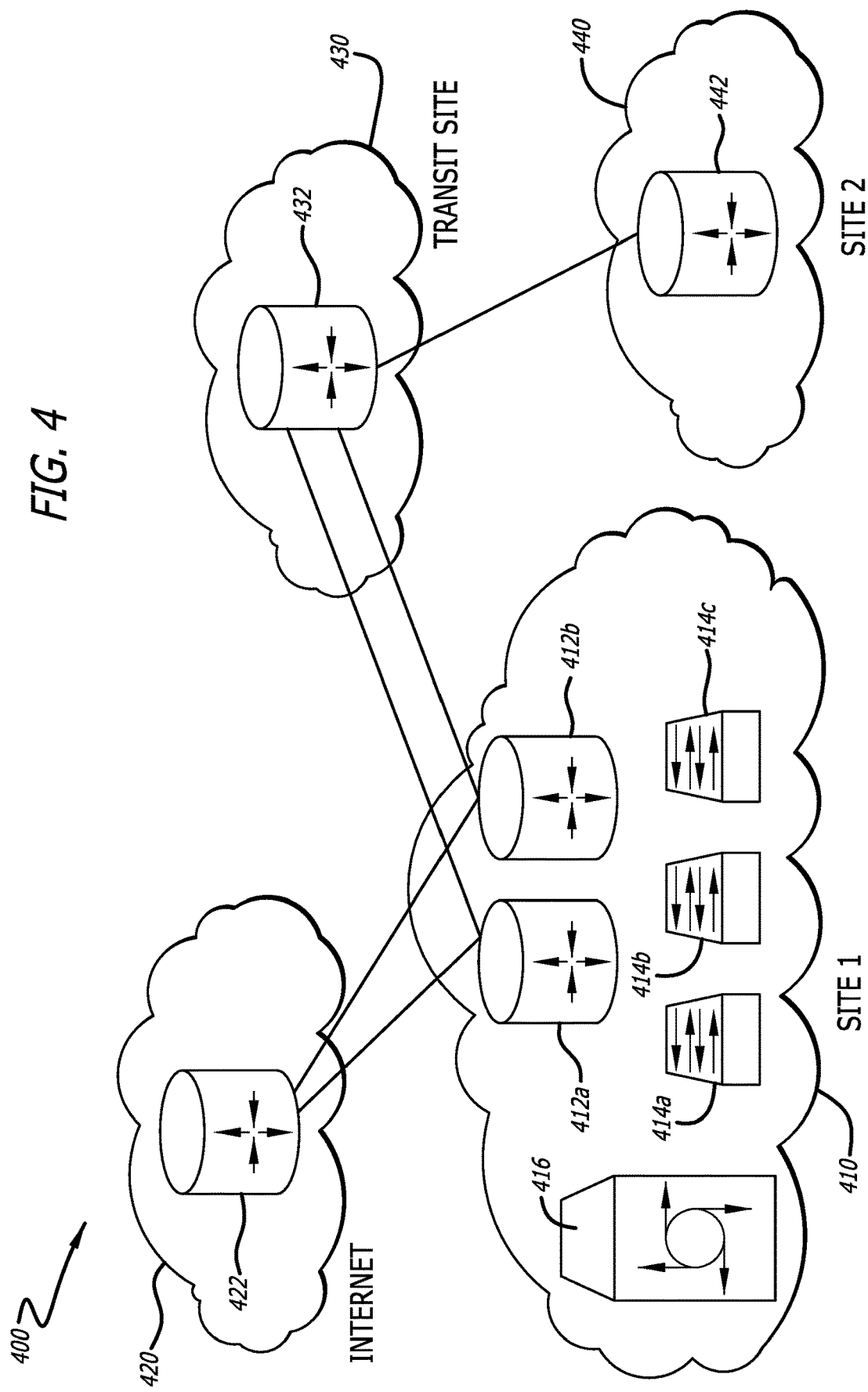
FIG. 4 is a diagram illustrating a network architecture of a multi-site environment in accordance with various embodiments of the disclosure.

Referring to FIG. 4, a diagram illustrating a network architecture of a multi-site environment 400 in accordance with various embodiments of the disclosure is shown. The embodiment depicted in FIG. 4 shows a first site 410, a second site 440, a transit site 430, and the Internet 420. The first site 410 may include two border routers 412a and 412b, and three edge switches 414a, 414b, and 414c. The first site may also include a control plane 416. Both border routers 412a and 412b of the first site 410 may be connected to a router 422 for the Internet and a router 432 in the transit site 430. The router 432 of the transit site 430 may be connected to a router 442 in the second site 440.

As shown in the embodiment depicted in FIG. 4, the border routers 412a and 412b at the first site 410 may connect the site to the Internet. The edge switches 414a, 414b, and 414c may have users and end devices connected to them and can be configured to provide Internet and multi-site connectivity (e.g., via fabric tunnels). In further embodiments, the control plane 416 at the first site 410 may manage the energy efficient operations of the border routers 412a and 412b and edge switches 414a, 414b, and 414c.

In many embodiments, during regular operation, both border routers 412a and 412b may register with the control plane 416 as load-balancing borders for Internet traffic (and/or for data center traffic when a data center is present). Hosts can be registered from the (fabric) edge switches 414a, 414b, and 414c. Along with these registrations, network usage data such as, but not limited to, the number of end devices from edge devices and Internet traffic counters on border routers may also be registered to the control plane 416. In more embodiments, the control plane 416 may update the network usage data, periodically or from time to time.

In the event that the border routers 412a and 412b do not have data about end devices (users) connected to the edge switches 414a, 414b, and 414c and accessing the Internet, the border routers 412a and 412b can be configured to always be up and running. By way of a non-limiting example, even if Internet traffic counters on border routers 412a and 412b are 0, these borders cannot decide to go into the power saving mode because one or more end devices/users may need to access the Internet at any time. On the other hand, in a number of embodiments, the control plane 416 may keep track of the end devices/users connected to the edge switches 414a, 414b, and 414c, as well as Internet traffic counters on the border routers 412a and 412b. In the event that the number of registered end devices/users decreases (e.g., as users deregister) and traffic counters on border routers 412a and 412b confirm that the total amount of Internet traffic can be handled by one border, the control plane 416 may decide that the first site 410 may not need two borders.

In additional embodiments, once the control plane 416 determines that one or more boarder routers should be placed into a power saving mode, the control plane 416 may update the edge switches 414a, 414b, and 414c with the availability of just one border. Therefore, the edge switches 414a, 414b, and 414c, instead of load balancing between two borders, may tunnel Internet traffic to just the one border to remain in normal operation. Further, the control plane 416 may publish its intention of power saving to both border routers 412a and 412b. Accordingly, one of the border router may enter a low power mode based on the recommendation or instruction from the control plane 416.

When the number of end devices/users on the edge switches 414a, 414b, and 414c increases again, or when traffic counters on the border router in normal operation exceed a threshold, edge switches 414a, 414b, and 414c and/or the border router in normal operation may update the control plane 416. The control plane 416, in response to the update, may decide to bring back up the border router that is in the low power mode, and may publish its intention to both border routers 412a and 412b. Once both border routers 412a and 412b are in normal operation again, the control plane 416 may instruct the edge switches 414a, 414b, and 414c to start load balancing traffic again to both border routers 412a and 412b. The above process describes the power saving operation for the Internet border. However, in a variety of embodiments, a same or similar power saving process may be applied to the multi-site path of the border routers and/or edge switches using intelligence at the control plane 416.

Although a specific embodiment for a network architecture for a multi-site environment suitable for carrying out the various steps, processes, methods, and operations described herein is discussed with respect to FIG. 4, any of a variety of systems and/or processes may be utilized in accordance with embodiments of the disclosure. For example, the control plane may be extended to manage energy efficiency in a distributed cloud environment with multiple data centers and edge computing nodes. The elements depicted in FIG. 4 may also be interchangeable with other elements of FIGS. 1-3 and 5-10 as required to realize a particularly desired embodiment.

Figure 5:
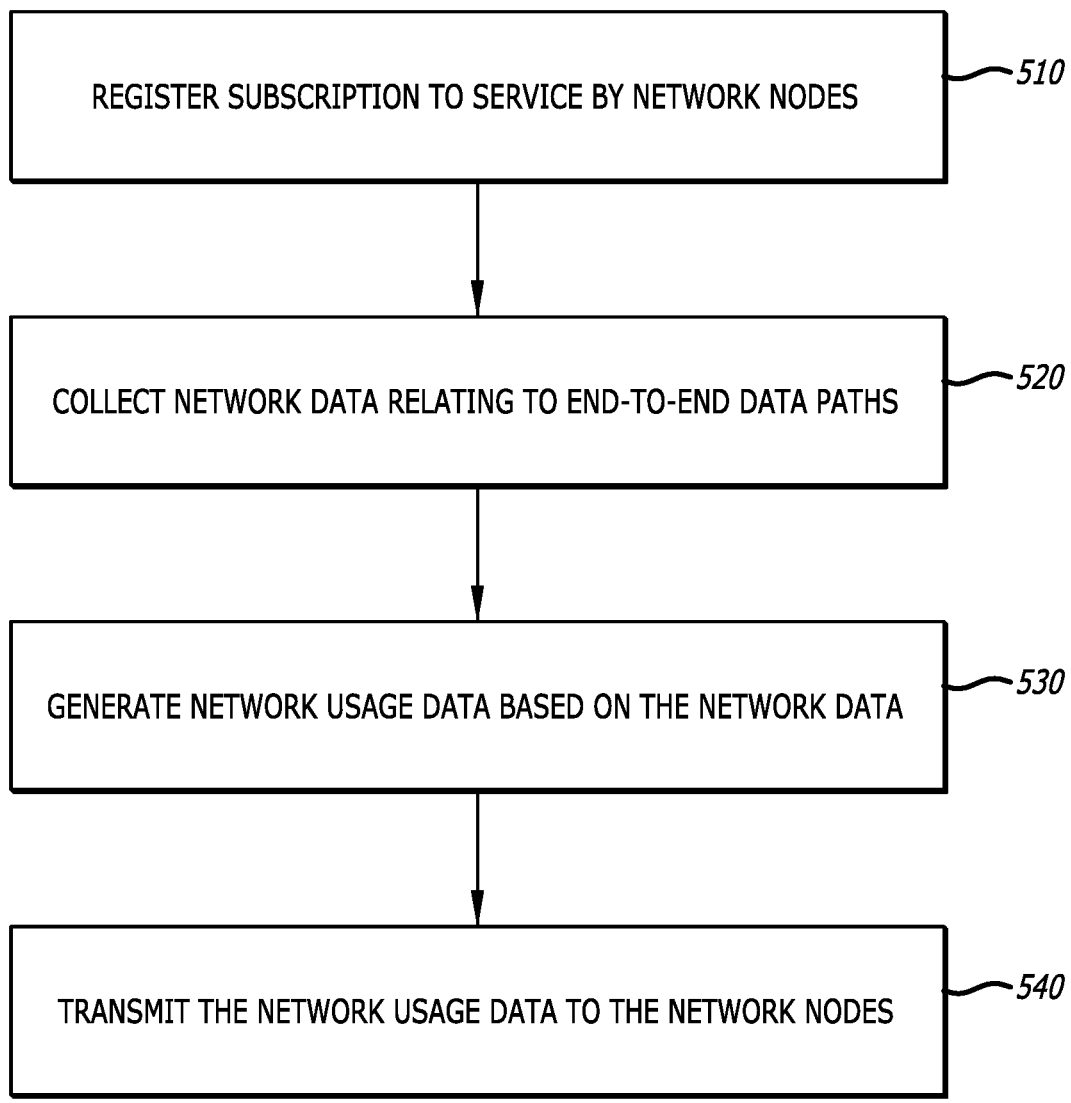
FIG. 5 is a flowchart depicting a process for managing energy efficiency in a network through a control plane in accordance with various embodiments of the disclosure.

Referring to FIG. 5, a flowchart depicting a process 500 for managing energy efficiency in a network through a control plane in accordance with various embodiments of the disclosure is shown. In many embodiments, the process 500 may register subscription to service by network nodes (block 510). Network nodes, such as, but not limited to, routers and switches, may subscribe to the energy efficiency service provided by the control plane. As a result, the control plane may then keep track of the participating network nodes and their respective power saving capabilities.

In a number of embodiments, the process 500 can collect network data relating to end-to-end paths (block 520). The control plane may gather real-time data about the network's topology, traffic patterns, and the number of connected devices. In certain embodiments, the control plane may use this network condition data to analyze the current state of the network and identify potential areas or opportunities for energy optimization, such as, but not limited to, underutilized devices or network segments.

In a variety of embodiments, the process 500 may generate network usage data based on the network data (block 530). The control plane may process the collected network data and may create a dataset including network usage data. The network usage data may include energy saving recommendations or instructions for individual network nodes. In further embodiments, the recommendations or instructions may take into account the real-time network conditions, the power saving capabilities of the devices, and the overall network performance specification (e.g., a service level agreement (SLA) specification).

In some embodiments, the process 500 may transmit the network usage data to the network nodes (block 540). The control plane may, in certain of these embodiments, send the generated network usage data and energy saving recommendations or instructions to the subscribing network nodes. Upon receiving this network usage data, the network nodes may adjust their power saving settings accordingly.

Although a specific embodiment for a process managing energy efficiency in a network through a control plane suitable for carrying out the various steps, processes, methods, and operations described herein is discussed with respect to FIG. 5, any of a variety of systems and/or processes may be utilized in accordance with embodiments of the disclosure. For example, the control plane may incorporate one or more machine learning processes to predict network usage patterns and proactively adjust energy saving settings for one or more network devices. The elements depicted in FIG. 5 may also be interchangeable with other elements of FIGS. 1-4 and 6-10 as required to realize a particularly desired embodiment.

Figure 6:
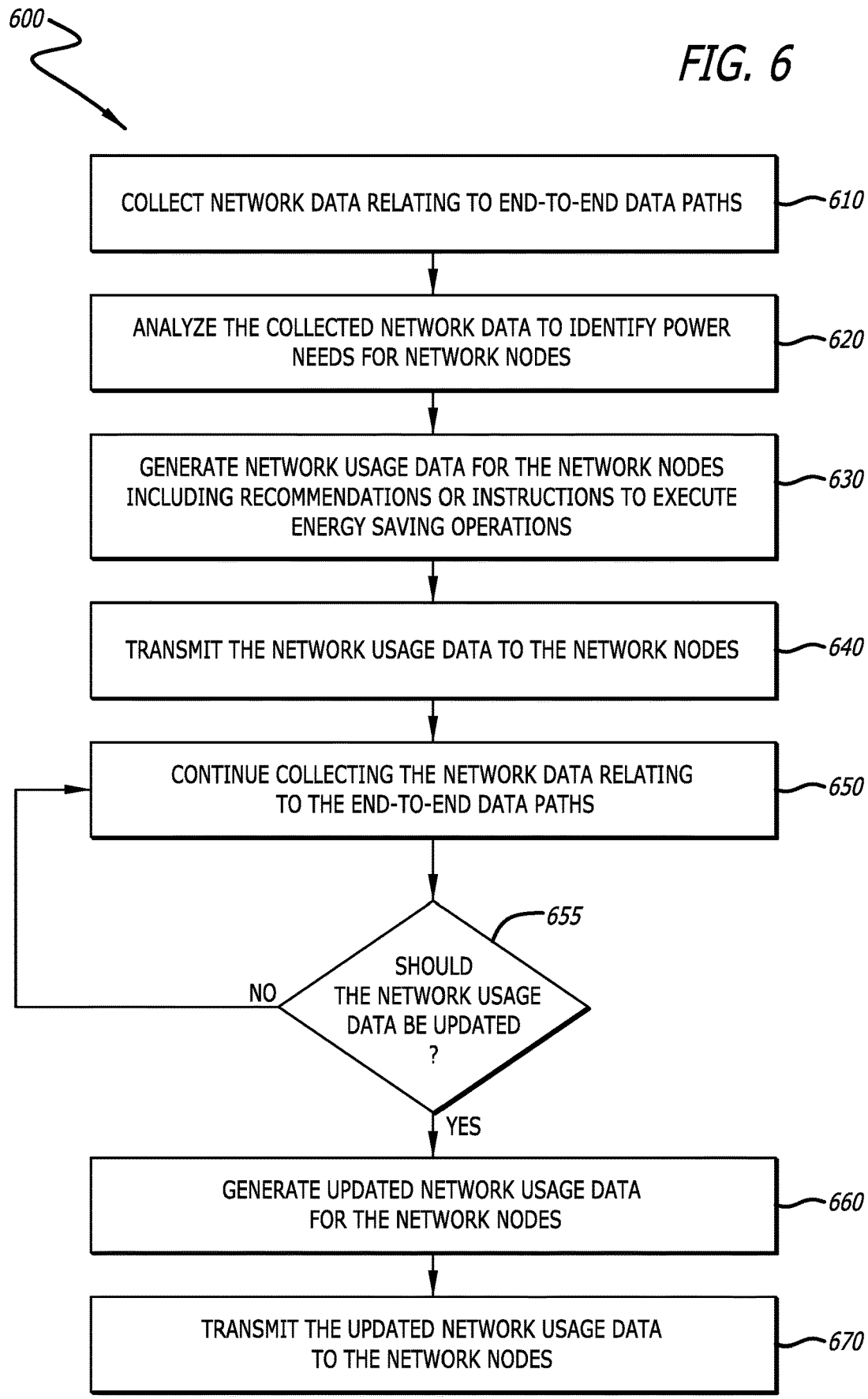
FIG. 6 is a flowchart depicting a process for continuous monitoring and optimization of energy efficiency in a network through a control plane in accordance with various embodiments of the disclosure.

Referring to FIG. 6, a flowchart depicting a process 600 for continuous monitoring and optimization of energy efficiency in a network through a control plane in accordance with various embodiments of the disclosure is shown. In many embodiments, the process 600 may collect network data relating to end-to-end paths (block 610). The control plane may gather real-time data about the network's topology, traffic patterns, and the number of connected devices. The control plane may, in certain embodiments, utilize this network condition data to analyze the current state of the network and identify potential areas or opportunities for energy optimization.

In a number of embodiments, the process 600 may analyze the collected network data to identify power needs for network nodes (block 620). In even further embodiments, the control plane may process the collected network data and can determine the power specification for each network node based on factors such as, but not limited to, the real-time network conditions, the power saving capabilities of the devices, and the overall network performance specifications. Often, this analysis can also include identifying underutilized devices or network segments that may be placed into the power saving mode while still maintaining network performance and reliability.

In a variety of embodiments, the process 600 may generate network usage data for the network nodes, including recommendations or instructions to execute energy saving operations (block 630). The control plane may create a dataset that includes energy saving recommendations or instructions for individual network nodes, taking into account real-time network conditions and power needs. In some embodiments, the recommendations or instructions may be tailored to specific capabilities of each network node, ensuring that the energy saving operations are compatible with the hardware and software configurations of the network nodes.

In more embodiments, the process 600 may transmit the network usage data to the network nodes (block 640). The control plane may send the generated network usage data, including energy saving recommendations or instructions, to the subscribing network nodes. Upon receiving this data, the network nodes may adjust their power saving settings according to the recommendations or instructions.

In further embodiments, the process 600 may continue collecting the network data relating to the end-to-end paths (block 650). The control plane may continuously monitor the network's topology, traffic patterns, and the number of connected devices to ensure that the control plane is up to date with the latest network conditions and can adjust its energy saving recommendations or recommendations accordingly. By continuously collecting network data, the control plane may dynamically adapt its energy saving recommendations or instructions in response to fluctuations in network traffic or changes in user behavior.

In additional embodiments, the process 600 may determine if the network usage data should be updated (block 655). This decision may be based on factors such as, but not limited to, changes in network conditions, traffic patterns, or the number of connected devices. In further embodiments, in response to determining that the network usage data should be updated, the process 600 may generate updated network usage data for the network nodes (block 660). The control plane may process the latest network data and may create an updated dataset that may include new energy saving recommendations or instructions for individual network nodes. These updated recommendations or instructions may take into account the most recent network conditions, the power saving capabilities of the network nodes, and the overall network performance specifications. However, when the process 600 determines that the network usage data should not be updated, the process 600 may return to block 650 to continue collecting network data.

In still more embodiments, the process 600 may transmit the updated network usage data to the network nodes (block 670). The control plane can be configured to send the updated network usage data, including the updated energy saving recommendations or instructions, to the subscribing network nodes. In yet further embodiments, the subscribing network nodes may include new network nodes (i.e., network nodes that have subscribed since the last update) and old network nodes (i.e., network nodes that subscribed before the last update). Upon receiving the updated network usage data, the network nodes can adjust their power saving settings according to the new recommendations or instructions.

Although a specific embodiment for a process of continuous monitoring and optimization of energy efficiency in a network through a control plane suitable for carrying out the various steps, processes, methods, and operations described herein is discussed with respect to FIG. 6, any of a variety of systems and/or processes may be utilized in accordance with embodiments of the disclosure. For example, the control plane may integrate real-time analytics and predictive modeling techniques to enhance the accuracy and efficiency of its recommendations. The elements depicted in FIG. 6 may also be interchangeable with other elements of FIGS. 1-5 and 7-10 as required to realize a particularly desired embodiment.

Figure 7:
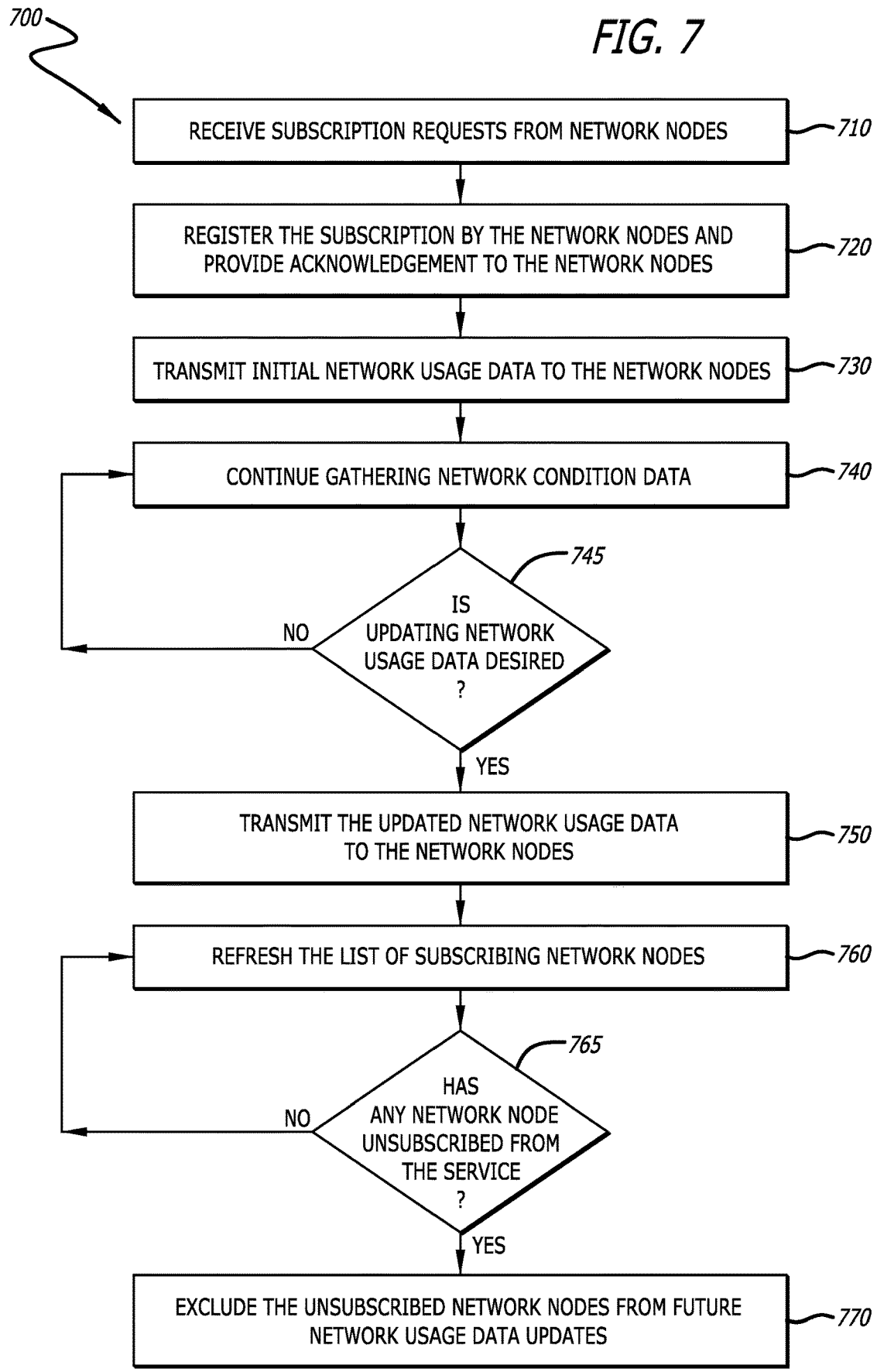
FIG. 7 is a flowchart depicting a process for managing subscriptions and network usage data updates in an energy efficient control plane in accordance with various embodiments of the disclosure.

Referring to FIG. 7, a flowchart depicting a process 700 for managing subscriptions and network usage data updates in an energy efficient control plane in accordance with various embodiments of the disclosure is shown. In many embodiments, the process 700 can receive subscription requests from network nodes (block 710). Network nodes, such as, but not limited to, routers and switches, may send requests to the control plane to subscribe to the energy efficiency service (e.g., upon receiving an ingress traffic flow). These requests can include data about the power saving capabilities and current network conditions of the network nodes.

In a number of embodiments, the process 700 may register the subscription by the network nodes and provide acknowledgment to the network nodes (block 720). Upon receiving the subscription requests, the control plane may register the network nodes, and may send acknowledgment messages to confirm their successful registration. In certain embodiments, this may establish a connection between the control plane and the network nodes for future communication and updates.

In a variety of embodiments, the process 700 may transmit initial network usage data to the network nodes (block 730). In further embodiments, once the network nodes are registered, the control plane may generate and send initial network usage data, including energy saving recommendations or instructions, to the network nodes. The network usage data may be configured to help the network nodes adjust their power saving settings (e.g., based on analyzing the network usage data at the network nodes or according to the recommendation or instructions from control plane).

In some embodiments, the process 700 may continue to gather network condition data (block 740). The control plane may continuously collect real-time data about the network's topology, traffic patterns, and the number of connected devices to ensure that the control plane is always up to date with the latest network conditions and can adjust its energy saving recommendations or instructions accordingly. This gathering can include passive reception of data or can include active seeking of data from one or more external sources.

In additional embodiments, the process 700 may determine if the network usage data should be updated (block 745). This decision may be based on a number of factors such as, but not limited to, changes in network conditions, traffic patterns, or the number of connected devices. In still further embodiments, in response to determining that the network usage data should be updated, the process 700 may transmit the updated network usage data to the network nodes (block 750). The control plane may generate updated network usage data and send it to the subscribing network nodes. The updated network usage data may include updated energy saving recommendations or instructions, helping the network nodes further optimize their energy efficiency. However, in still more embodiments, when the process 700 determines that the network usage data should not be updated, the process 700 may return to block 740 to continue gathering network condition data.

In still further embodiments, the process 700 may refresh the list of subscribing network nodes (block 760). Periodically, the control plane can update its list of subscribed network nodes to ensure that it is always up to date with the current participants in the energy efficiency service. This update can be done in response to one or more triggering events or can be configured to occur over a predetermined or dynamic interval.

In still additional embodiments, the process 700 may determine if any network node has unsubscribed from the network energy efficiency service (block 765). In certain embodiments, in response to determining that at least one network node has unsubscribed from the network energy efficiency service, the process 700 may exclude the unsubscribed network nodes from future network usage data updates (block 770). When a network node unsubscribes from the network energy efficiency service, the control plane may remove it from the list of subscribing network nodes and ensures that it no longer receives network usage data updates. This may allow the control plane to focus on providing energy saving recommendations and updates to the remaining subscribing network nodes and may reduce the burden on network nodes that may not need future network usage data.

By way of a non-limiting example, the subscription by a network node to the network energy efficiency service may be associated with a time of expiration. The network node may be automatically unsubscribed from the network energy efficiency service at the time of expiration, unless the network node chooses to resubscribe to the network energy efficiency service. However, in yet more embodiments, when the process 700 determines that no network node has unsubscribed from the network energy efficiency service, the process 700 may return to block 760 to refresh the list of subscribing network nodes.

Although a specific embodiment for a process for managing subscriptions and network usage data updates in an energy efficient control plane suitable for carrying out the various steps, processes, methods, and operations described herein is discussed with respect to FIG. 7, any of a variety of systems and/or processes may be utilized in accordance with embodiments of the disclosure. For example, the control plane may employ advanced data analytics techniques to monitor network conditions more accurately and dynamically adjust the energy saving recommendations based on real-time network behavior. The elements depicted in FIG. 7 may also be interchangeable with other elements of FIGS. 1-6 and 8-10 as required to realize a particularly desired embodiment.

Figure 8:
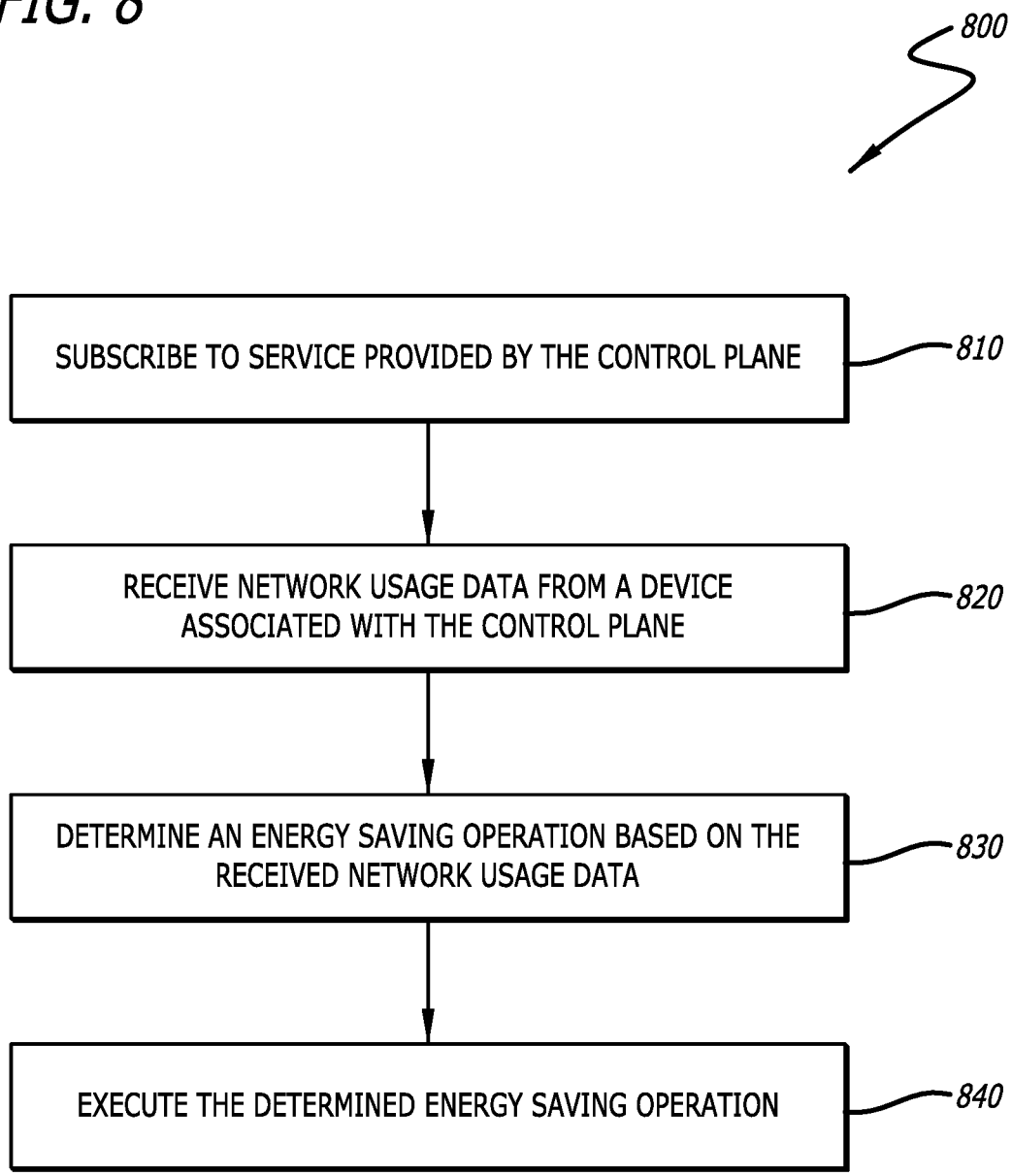
FIG. 8 is a flowchart depicting a process for optimizing energy efficiency in a network node using a control plane in accordance with various embodiments of the disclosure.

Referring to FIG. 8, a flowchart depicting a process 800 for optimizing energy efficiency in a network node using a control plane in accordance with various embodiments of the disclosure is shown. In many embodiments, the process 800 may subscribe to a network energy efficiency service provided by the control plane (block 810). Network nodes, such as, but not limited to, routers and switches, may send subscription requests to the control plane to access the network energy efficiency service (e.g., upon receiving an ingress traffic flow). By subscribing to the service, the network nodes can receive network usage data from the control plane. The network usage data may also be configured to include energy saving recommendations or instructions from the control plane.

In a number of embodiments, the process 800 may receive network usage data from a device associated with the control plane (block 820). Once the network node is subscribed to the energy efficiency service, the network node may receive network usage data from the control plane (in particular, from a device associated with the control plane). In this way, the network usage data may help the network node understand its current energy usage and identify areas for potential energy optimization.

In a variety of embodiments, the process 800 can determine an energy saving operation based on the received network usage data (block 830). The network node may analyze the received network usage data and identify an appropriate energy saving operation to be executed. This energy saving operation may involve adjusting power saving settings, transitioning to a low power mode, or deactivating features or components when not in use.

In further embodiments, the process 800 may execute the determined energy saving operation (block 840). Upon determining the energy saving operation, the network node may execute it to optimize energy efficiency. By implementing the energy saving operation, the network node may reduce its power consumption without compromising network performance and availability.

Although a specific embodiment for a process optimizing energy efficiency in a network node using a control plane suitable for carrying out the various steps, processes, methods, and operations described herein is discussed with respect to FIG. 8, any of a variety of systems and/or processes may be utilized in accordance with embodiments of the disclosure. For example, the network node may incorporate adaptive algorithms that dynamically adjust its energy saving operations in response to real-time network conditions and traffic patterns. The elements depicted in FIG. 8 may also be interchangeable with other elements of FIGS. 1-7, 9, and 10 as required to realize a particularly desired embodiment.

Figure 9:
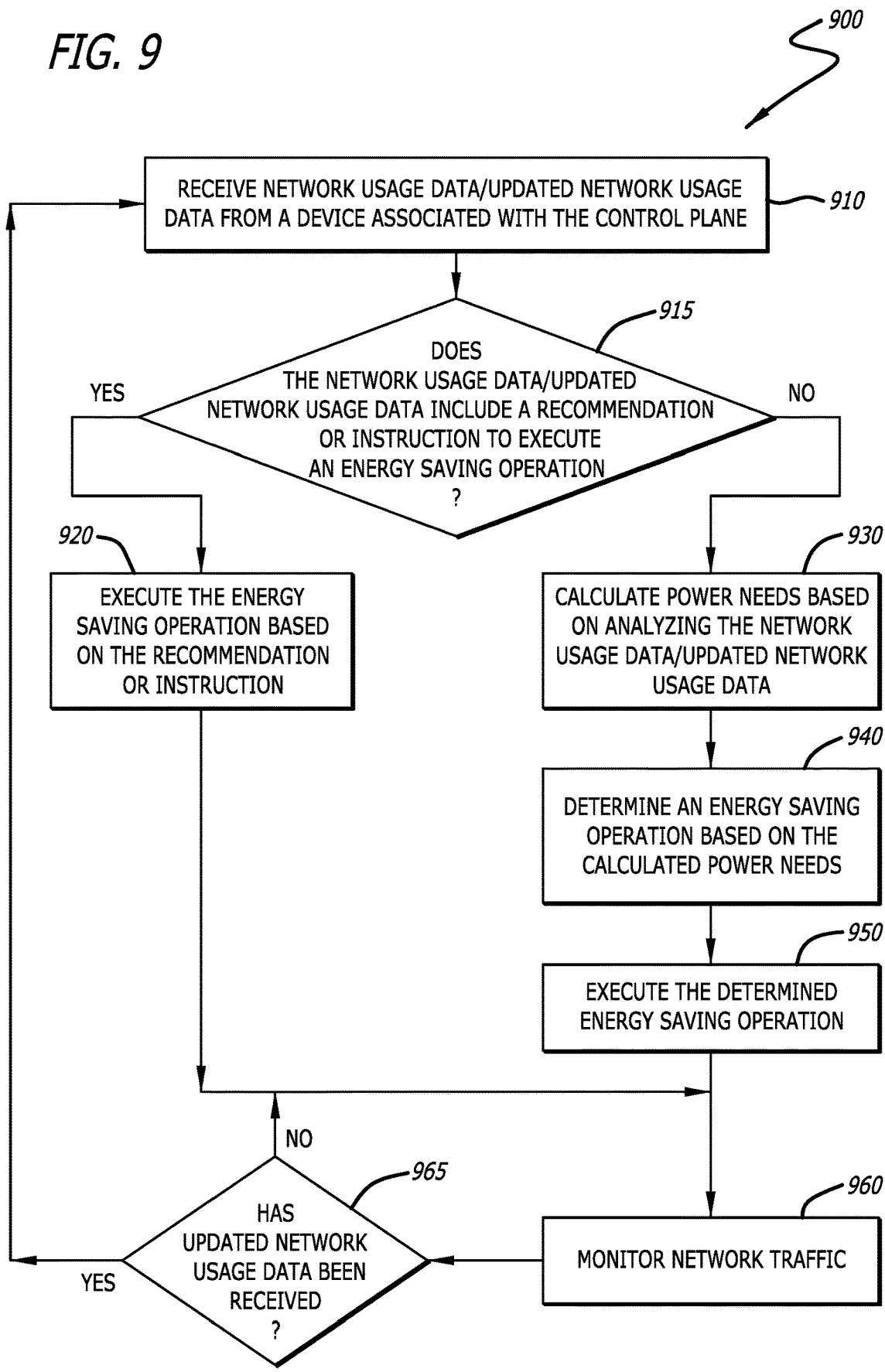
FIG. 9 is a flowchart depicting a process for optimizing energy efficiency in a network node based on network usage data and recommendations from a control plane in accordance with various embodiments of the disclosure.

Referring to FIG. 9, a flowchart depicting a process 900 for optimizing energy efficiency in a network node based on network usage data and recommendations from a control plane in accordance with various embodiments of the disclosure is shown. In many embodiments, the process 900 may receive network usage data or updated network usage data from a device associated with the control plane (block 910). The network node may receive network usage data from the control plane (in particular, from a device associated with the control plane). The network usage data may include energy saving recommendations or instructions. The network usage data may help the network node understand its current energy usage and identify areas and opportunities for potential energy optimization.

In a number of embodiments, the process 900 may determine if the network usage data or updated network usage data includes a recommendation or instruction to execute an energy saving operation (block 915). In a variety of embodiments, in response to determining that the network usage data or updated network usage data includes a recommendation or instruction to execute an energy saving operation, the process 900 may execute the energy saving operation based on the recommendation or instruction (block 920). Following the recommendation or instruction provided by the control plane, the network node can implement the energy saving operation to optimize its energy efficiency without compromising network performance and availability. In some embodiments, the network node may also log the execution of the energy saving operation for further analysis and reporting, which can enable a better understanding of energy efficiency improvements over time.

However, when it is determined that the network usage data or updated network usage data does not include a recommendation or instruction to execute an energy saving operation, the process 900 can calculate power needs based on analyzing the network usage data or updated network usage data (block 930). In certain embodiments, the network node may analyze the received network usage data, and may calculate its power needs, taking into account factors such as real-time network conditions, traffic patterns, and device capabilities. In various embodiments, the power needs calculation may take into account one or more of the hardware specifications, software configurations, and workload specifications of the network node to ensure an accurate estimation of the energy consumption at the network node.

In more embodiments, the process 900 may determine an energy saving operation based on the calculated power needs (block 940). Based on the calculated power needs, the network node can be configured to identify an appropriate energy saving operation to be executed, which may involve adjusting power saving settings, transitioning to a low power mode, or deactivating specific features or components when not in use. In still more embodiments, the network node may also consider the potential impact of the energy saving operation on the overall network performance, ensuring that the energy efficiency improvements do not negatively affect the quality of service.

In additional embodiments, the process 900 may execute the determined energy saving operation (block 950). During the execution of the energy saving operation, the network node can actively monitor its internal components and processes to ensure a smooth transition to the new power configuration state. The network node may also provide feedback to the control plane regarding the effectiveness of the implemented energy saving operation.

In further embodiments, the process 900 may monitor network traffic (block 960). The network node may continuously monitor network traffic to ensure that it is always up to date with the latest network conditions and can adjust its energy saving operations accordingly. In yet more embodiments, the network node may utilize advanced traffic analysis techniques, such as, but not limited to, deep packet inspection or flow-based monitoring, to gain a more comprehensive understanding of the network traffic patterns and their impact on energy consumption.

In still yet more embodiments, the process 900 can determine if updated network usage data has been received (block 965). If the updated network usage data is received, the process 900 may again determine whether to execute an energy saving operation based on the new network usage data (block 915). However, when the process 900 determines that no updated network usage data has been received, the process 900 may continue monitoring network traffic (block 960).

Although a specific embodiment for a process optimizing energy efficiency in a network node based on network usage data and recommendations from a control plane suitable for carrying out the various steps, processes, methods, and operations described herein is discussed with respect to FIG. 9, any of a variety of systems and/or processes may be utilized in accordance with embodiments of the disclosure. For example, the network node may leverage one or more machine learning processes to generate predictions regarding future network traffic patterns and responsively adjust its energy saving operations. The elements depicted in FIG. 9 may also be interchangeable with other elements of FIGS. 1-8 and 10 as required to realize a particularly desired embodiment.

Figure 10:
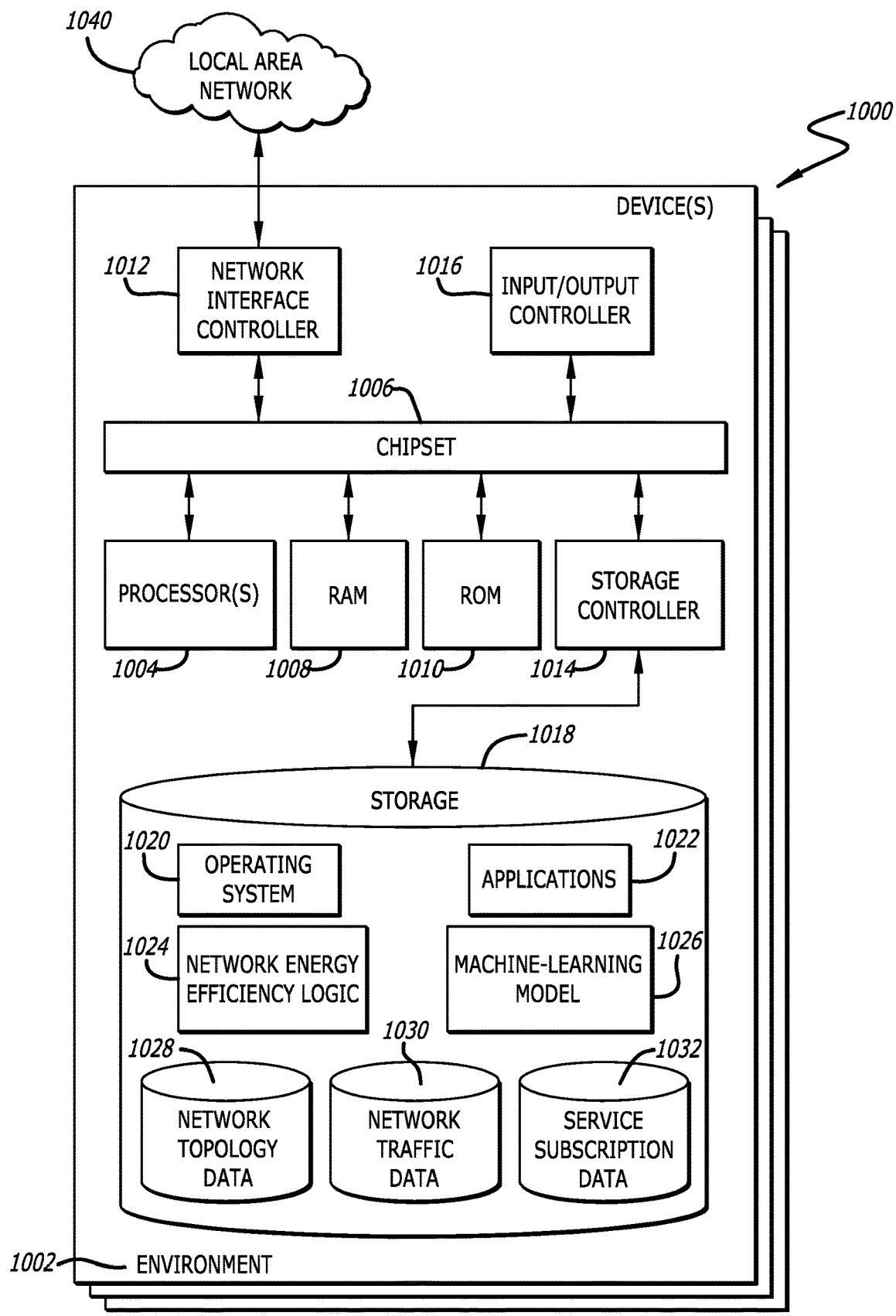
FIG. 10 is a conceptual block diagram for one or more devices capable of executing components and logic for implementing the functionality and embodiments described above.

Referring to FIG. 10, a conceptual block diagram for one or more devices 1000 capable of executing components and logic for implementing the functionality and embodiments described above is shown. The embodiment of the conceptual block diagram depicted in FIG. 10 can illustrate a conventional network device, switch, router, server computer, workstation, desktop computer, laptop, tablet, network appliance, e-reader, smartphone, or other computing device, and can be utilized to execute any of the application and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring data between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, and data 1028, 1030, 1032, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the data being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store data within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access data from the storage 1018 by detecting the physical states or characteristics of one or more particular locations within the physical storage units.

In addition to the storage 1018 described above, the device 1000 can have access to other computer-readable storage media to store and retrieve data, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more computer devices 1000 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired data in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10, and can include other components that are not explicitly shown in FIG. 10, or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a network energy efficiency logic 1024. The energy efficiency logic 1024 may process network data, analyze power needs, and generate energy saving recommendations or instructions for the network nodes to optimize their energy efficiency.

In a number of embodiments, the storage 1018 can include network topology data 1028. The network topology data 1028 may include data about the structure of the network, including the connections and relationships between network nodes, which may be used to identify potential areas and opportunities for energy optimization. This data may be collected from one or more network devices, from a centralized source, or may be inferred based on data passing through the control plane or other encompassing device 1000.

In various embodiments, the storage 1018 can include network traffic data 1030. The network traffic data 1030 may include real-time data about data flow and usage patterns across the network, enabling the control plane to adapt its energy saving recommendations based on the current network conditions. This network traffic data 1030 can be gathered from various sources or from a pattern of communication between network devices. Those skilled in the art will recognize that network traffic data 1030 can be obtained in a variety of ways.

In still more embodiments, the storage 1018 can include service subscription data 1032. The service subscription data may store the subscription data for network nodes participating in the energy efficiency service, allowing the control plane to maintain an up-to-date list of subscribing network nodes and provide them with timely and relevant energy saving recommendations. As discussed above, subscription service data 1032 can be utilized to determine where and when to transmit sustainability-related data to one or more network devices/nodes.

Finally, in many embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026.

The ML model 1026 may be configured to learn the pattern of the traffic flow between two or more devices. In certain embodiments, ML models 1026 can also be utilized in the control plane to analyze historical network data and predict future network usage patterns, enabling the system to proactively adjust energy saving recommendations for network nodes. Additionally, ML models 1026 and similar processes may be utilized in some embodiments to help identify patterns and relationships between network conditions and energy consumption, allowing for more accurate and efficient energy-saving operations across the network.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
at least one network interface controller configured to provide access to a network; and
a memory communicatively coupled to the processor, wherein the memory comprises an energy efficiency logic that is configured to:
collect network data relating to one or more end-to-end paths, wherein a control plane continuously monitors any one of a network topology, traffic patterns, and number of connected devices to ensure that the control plane is current with latest network conditions;
register at least one network node of the network as a subscriber of network energy efficiency service;
determine a network usage data associated with the at least one network node, the network usage data being associated with one or more energy saving operations in at least one end-to-end path including the at least one network node;
dynamically adapt one or more energy saving recommendations in response to fluctuations in network traffic or changes in user behavior;
transmit the network usage data to the at least one network node; and
in response to determining that at least one network node has unsubscribed from the network energy efficiency service, excluding the unsubscribed network nodes from future network usage data updates, wherein the control plane ensures that the unsubscribed node no longer receives network usage data updates.

2. The device of claim 1, wherein the network usage data is associated with at least one of a number of end devices associated with the at least one network node, a data rate, application data, network traffic data, one or more network traffic counters, one or more NetFlow records, or a power usage estimate.

3. The device of claim 1, the energy efficiency logic being further configured to:
detect an update to the network usage data associated with the at least one network node; and
transmit the updated network usage data to the at least one network node.

4. The device of claim 1, the energy efficiency logic being further configured to:
identify an energy saving opportunity for the at least one network node, wherein the network usage data includes an instruction or a recommendation to execute at least one energy saving operation at the at least one network node.

5. The device of claim 4, wherein the at least one energy saving operation includes changing an energy saving level, the energy saving level being associated with power delivered to the at least one network node by a power sourcing equipment (PSE) network device.

6. The device of claim 1, wherein the device is associated with a control plane of the network.

7. The device of claim 6, wherein the control plane of the network utilizes at least one control protocol including at least one of a border gateway protocol-Ethernet virtual private network (BGP-EVPN), a locator/identifier (ID) separation protocol (LISP), or an overlay management protocol (OMP).

8. The device of claim 6, wherein the control plane of the network resides on-premises or in a cloud.

9. A network node, comprising:
a processor,
at least one network interface controller configured to provide access to a network; and
a memory communicatively coupled to the processor, wherein the memory comprises energy efficiency logic that is configured to:
collect network data relating to one or more end-to-end paths, wherein the control plane continuously monitors the network's topology, traffic patterns, and the number of connected devices to ensure that the control plane is current with the latest network conditions;
dynamically adapt one or more energy saving recommendations in response to fluctuations in network traffic or changes in user behavior;
subscribe to a network energy efficiency service provided at least in part by a control plane of the network;
receive a network usage data from a device associated with the control plane of the network, the network usage data being associated with one or more energy saving operations in at least one end-to-end path including the network node;
execute at least one energy saving operation based on the network usage data;
in response to determining that at least one network node has unsubscribed from the network energy efficiency service, excluding the at least one unsubscribed network nodes from future network usage data updates, wherein the control plane ensures that the unsubscribed node no longer receives network usage data update; and
wherein the control plane ensures that the unsubscribed node no longer receives network usage data updates.

10. The network node of claim 9, wherein the network node includes at least one of a router, a switch, a server, an access point, a wireless controller, a voice over internet protocol (VoIP) telephone, an internet of things (IoT) device, or a power over Ethernet (PoE) powered device.

11. The network node of claim 9, wherein the network usage data is associated with at least one of a number of end devices associated with the network node, a data rate, application data, network traffic data, one or more network traffic counters, one or more NetFlow records, or a power usage estimate.

12. The network node of claim 9, wherein the at least one energy saving operation includes adjusting a power consumption setting of at least one component of the network node.

13. The network node of claim 12, wherein adjusting the power consumption setting of the at least one component of the network node includes at least one of: powering down the network node, powering up the network node, deactivating a power supply module, activating the power supply module, entering a low power mode, exiting the low power mode, changing an energy saving level, switching off a transmitter, switching on the transmitter, switching off a receiver, or switching on the receiver.

14. The network node of claim 9, the energy efficiency logic being further configured to:
   determine a power need for the network node based on analyzing the network usage data; and
   determine the at least one energy saving operation based on the determined power need for the network node.

15. The network node of claim 9, wherein the network usage data includes an instruction or a recommendation to execute the at least one energy saving operation at the network node.

16. The network node of claim 9, wherein the at least one energy saving operation includes changing an energy saving level, the energy saving level being associated with power delivered to the network node by a power sourcing equipment (PSE) network device.

17. The network node of claim 16, the energy efficiency logic being further configured to:
   negotiate a power delivery configuration with the PSE network device based on a discovery protocol.

18. The network node of claim 9, the energy efficiency logic being further configured to:
   receive updated network usage data from the device associated with the control plane of the network; and
   execute at least one second energy saving operation based on the updated network usage data.

19. The network node of claim 9, wherein a subscription to the network energy efficiency service is associated with a granularity level corresponding to a scope.

20. A method for reducing network energy consumption, comprising:
   collecting network data relating to one or more end-to-end paths,
   monitoring any one of a network topology, traffic patterns, and the number of connected devices to ensure that the control plane is current with the latest network conditions;
   registering at least one network node of a network as a subscriber of network energy efficiency service;
   dynamically adapting one or more energy saving recommendations in response to fluctuations in network traffic or changes in user behavior;
   determining network usage data associated with the at least one network node, the network usage data being associated with one or more energy saving operations in at least one end-to-end path including the at least one network node; and
   transmitting the network usage data to the at least one network node; and
   in response to determining that at least one network node has unsubscribed from the network energy efficiency service, excluding the at least one unsubscribed network nodes from future network usage data updates, wherein the control plane ensures that the unsubscribed node no longer receives network usage data update, wherein the control plane ensures that the unsubscribed node no longer receives network usage data updates.

* * * * *